(12) United States Patent
Greenwald et al.

(10) Patent No.: US 6,520,849 B1
(45) Date of Patent: Feb. 18, 2003

(54) INTEGRATED STRUCTURAL HVAC SYSTEM

(75) Inventors: Pamela Sue Greenwald, Sterling Heights, MI (US); Mark James Zima, Clarence Center, NY (US); Daniel V. Beckley, Lapeer, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/540,624

(22) Filed: Mar. 31, 2000

(51) Int. Cl.$^7$ ................................................ B60H 1/26
(52) U.S. Cl. ..................... 454/121; 296/70; 296/208
(58) Field of Search ................................ 454/121, 126; 296/70, 208

(56) References Cited

U.S. PATENT DOCUMENTS

| | | | |
|---|---|---|---|
| 5,326,130 A | | 7/1994 | Gedeon et al. ............. 280/752 |
| 5,556,153 A | * | 9/1996 | Kelman ....................... 296/70 |
| 5,564,769 A | | 10/1996 | Deneau et al. ............... 296/72 |
| 5,676,216 A | | 10/1997 | Palma et al. ................. 180/90 |
| 5,709,601 A | * | 1/1998 | Heck ........................ 454/121 |
| 5,957,498 A | | 9/1999 | Holland et al. ............. 280/779 |
| 5,979,965 A | * | 11/1999 | Nishijima et al. ............ 296/70 |
| 6,027,088 A | | 2/2000 | Stedman et al. ............ 248/200 |
| 6,110,037 A | * | 8/2000 | Yoshinaka ................ 296/70 X |
| 6,203,092 B1 | * | 3/2001 | Yoshinaka ................... 296/70 |

FOREIGN PATENT DOCUMENTS

| | | |
|---|---|---|
| EP | 0960785 A2 | 12/1999 |
| WO | WO 00/50292 | 8/2000 |

OTHER PUBLICATIONS

International Search Report, corresponding to International Application No. PCT/US 01/40389, dated Mar. 28, 2001 and a copy of each of the publications cited therein.

* cited by examiner

*Primary Examiner*—Harold Joyce
(74) *Attorney, Agent, or Firm*—Kathryn A. Marra (57) ABSTRACT

In one exemplary embodiment, an integrated structural HVAC system (ISHS) includes an ISHS first section and an ISHS second section which are secured to one another to form the ISHS. In one embodiment, the ISHS first section includes a molded first cross beam which includes integral molded features and the ISHS second section likewise comprises a molded second cross beam having integral molded features. The first cross beam includes a number of vent openings formed therein and the second cross beam includes a plurality of fluid ducts formed therein. The first cross beam and second cross beam mate with each other and are securely attached to one another to form the ISHS. In a preferred embodiment, the fluid ducts provide both cockpit/instrument panel structure as well as fluid channels for directing air to desired locations within a vehicle compartment or the like.

31 Claims, 7 Drawing Sheets

INTEGRATED STRUCTURAL HVAC SYSTEM

TECHNICAL FIELD

This invention relates generally to automotive interior structures and more particularly to a cockpit/instrument panel beam having molded features including HVAC components, integral ducts, wiring channels and integral attachments for an air bag module, etc.

BACKGROUND OF THE INVENTION

It is well known in motor vehicles to provide an instrument panel beam extending transversely between the front pillars of an automotive body to provide structural rigidity to the vehicle and to mount interior components using mounting brackets, fasteners and other joining techniques. Likewise in a cockpit setting, a structural beam extends thereacross.

Motor vehicles include a plurality of interior components mounted in the forward portion including steering column supports, driver and passenger knee bolsters, vehicle instruments, air bags, etc. The typical motor vehicle instrument panel beam structure is comprised of a metal beam assembly fastened to and extending between the front pillars of the vehicle. During manufacturing of a vehicle instrument panel structure, the beam is located in a fixture and locating tools are used to accurately and properly position component brackets to be attached to the beam. The components, typically extending from these brackets, are located relative to the beam and are typically attached to the beam assembly using a plurality of fasteners. Existing designs also include tubular beams and stamped beams requiring brackets and multiple fasteners to securely fasten components in place along the beam. The location and attachment of component brackets in existing instrument panel structure designs is time consuming, expensive and fairly difficult to adapt to changing designs and alternate vehicle configurations. Such designs, because of the plurality of parts, fasteners and bracket, are also prone to problems caused by vibration, squeaks rattles and dimensional stability.

It is also known in the art to manufacture instrument panel beams from plastic and fiber reinforced plastic materials. Some of these designs include pockets adapted to receive various components which are secondarily bonded or fastened therein. The pockets provided in this type design allow for easier location and placement of components however, as is a problem with the metal beams discussed above, this type of design is also inflexible. Molds for manufacturing plastic beams are difficult and expensive to change as well as the requirement that each type of beam requires a separate mold. In addition, additional ducting assemblies are commonly attached to the instrument panel beam to form air ducting channels.

SUMMARY OF THE INVENTION

This invention offers advantages and alternatives over the prior art by providing an integrated structural HVAC system (ISHS). In one exemplary embodiment, the ISHS is constructed of a plurality of molded members. For example, one exemplary ISHS includes an ISHS first section, e.g., an upper section, and an ISHS second section, e.g, a lower section, which are secured to one another to form the ISHS of the present invention. In one embodiment, the ISHS first section includes a molded first cross beam which includes integral molded features formed thereon. The ISHS first section has an upper wall and a rear wall which is integral thereto. The upper wall includes an elongated opening to provide air flow therethrough in a direction towards a windshield when the ISHS is assembled within a passenger compartment of a vehicle body. The rear surface has end openings formed therein and an intermediate opening formed therebetween, wherein the end openings and the intermediate opening provide vent outlets for directing air from the ISHS to desired locations in the vehicle compartment.

The ISHS second section includes a second cross beam which has a first end and an opposing second end and is formed by an integral structure having an upper surface and a rear surface. The lower cross beam includes an HVAC module upper casework which extends downwardly in a direction away from the upper surface. The HVAC module upper casework includes an inlet portion in which fluid flows therethrough into the HVAC module upper casework where the fluid is distributed into a number of fluid flow paths. The lower cross beam and more specifically the upper surface thereof includes a number of fluid ducts formed therein. More specifically, the lower cross beam includes a first duct which extends generally from the first end to the second end of the lower cross beam. An exemplary first duct has open ends at first and second ends thereof and preferably end portions at the first and second ends are arcuate in nature and extend away from the rear surface. In an exemplary embodiment, the first duct comprises an air conditioning duct and is in fluid communication with the HVAC module upper casework so that fluid, e.g., air, entering the HVAC module upper casework efficiently flows through openings formed at an upper portion of the HVAC module upper casework and into the first duct where the fluid flows to the open first and second ends thereof.

The HVAC module upper casework is formed by a portion of the rear surface and an opposing front surface and opposing side surfaces which are all integral to one another to form the HVAC module upper casework. In the illustrative embodiment, the HVAC module upper casework is generally rectangular in shape with one end being open to permit fluid to flow through the inlet portion and into a central cavity formed in the HVAC module upper casework. A center duct is formed within the lower cross beam at the upper portions of the HVAC module upper casework, wherein the center duct has an opening facing the rear surface and is generally disposed so that the center duct partitions the first duct into a first section and a second section. The center duct is also in fluid communication with the HVAC module upper casework so that fluid entering the inlet portion is permitted to flow through the center duct and be directed outwardly from the rear surface. Formed at the center duct is a pair of slots which serve as entrance passageways into the first duct so that fluid flowing through the module casework is directed through the slots and into the first and second sections of the first duct.

The lower cross beam also includes a second duct formed therein. The second duct is preferably formed adjacent the first duct and is divided into a first section and a second section by a third duct which preferably comprises a rectangular opening formed in the lower cross beam. The third duct is thus in fluid communication with the central cavity and fluid flowing through the third duct is permitted to flow into the second duct. Each of the first and second sections of the second duct includes a closed end and an open end which is in fluid communication with the third duct. In one exemplary embodiment, the second duct comprises a side window defogger duct and the third duct comprises a windshield defogger duct.

In assembling the ISHS, the lower cross beam and the upper cross beam mate with each other so that the upper wall of the upper section is disposed above the upper surface of the lower cross beam so as to enclose the first, second, and third ducts. When the lower cross beam and the upper cross beam mate with each other, the first duct extends through the end openings formed in the rear surface of the upper cross beam. In addition, the elongated opening is aligned with the third duct so that fluid flowing therethrough is directed away from the upper surface of the upper section towards a desired location, i.e., a windshield. In addition, the center duct aligns with the intermediate opening formed in the rear surface of the upper section. The upper and lower cross beams may be securely attached to one another by any number of suitable processes including a welding process.

According to the present invention, the present ISHS overcomes the deficiencies and limitations of the prior art by providing an integrated structure having a high degree of functional and physical integration which offers the following benefits. First, the present invention provides product packaging improvements due to the HVAC module integration into the cross-car beam. This integration enables the HVAC module to be packaged in a higher vehicle position enabling a more spacious interior compartment as well as more efficient air flow. Second, due to the high degree of integration, the cost of the ISHS compared to conventional multi-component devices shows a competitive benefit. Third, the mass of the ISHS shows an improvement versus prior art because of the high level of part integration. Fourth, tooling cost is improved compared to conventional prior art due to the maximized feature integration of the ISHS. The ISHS of the present invention also provides the ability to tune structural performance by strategic material selection and part design. The high level of integration demonstrated in the ISHS provides for a more robust system design because the integral nature of the ISHS eliminates the need to attach parts to the main structure. Fewer attached parts translates to less opportunity for squeak and rattle and other quality deficiencies.

It being understood that the present invention is directed towards an ISHS formed of a plurality of molded members, wherein in an assembled state, a plurality of fluid ducts are formed. For example, the ISHS may be formed of two molded members (e.g., an upper and lower member) or it may be formed of three or more molded members which define the plurality of fluid ducts when the molded members are assembled.

The above discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings wherein like elements are numbered alike in the several Figures.

DESCRIPTION OF THE PREFERRED EMBODIMENT

Figure 1:
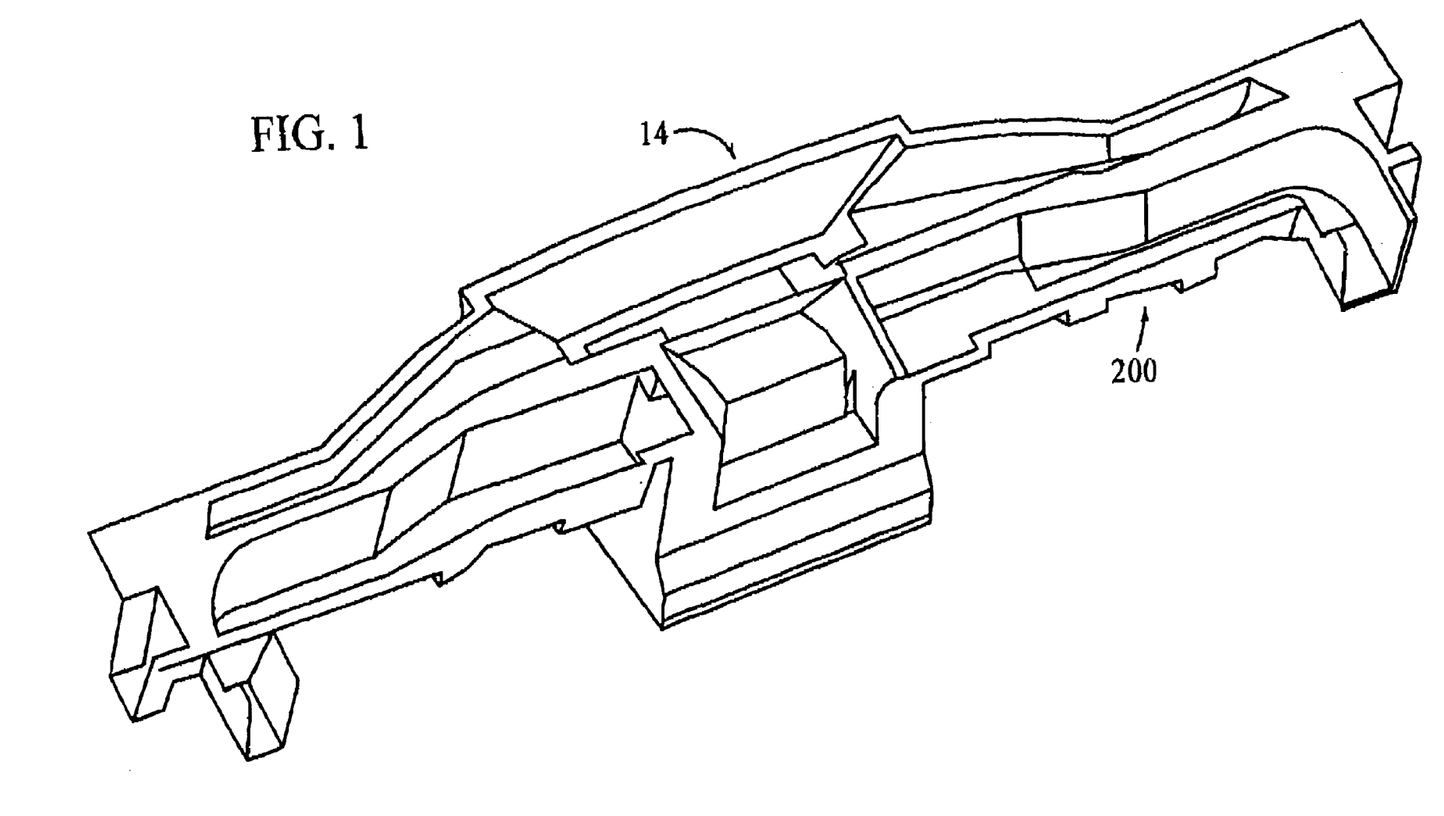
FIG. 1 is an exploded view of an exemplary integrated structural HVAC system (ISHS)

Referring to FIG. 1 there is shown an integral cockpit/ instrument panel structure, generally designated at 10. More specifically, the integral cockpit/instrument panel structure comprises an integrated structural HVAC system (ISHS) 10 formed of a plurality of molded members. The ISHS 10 comprises a first section 12 and a second section 14. In the illustrated embodiment, the first section 12 comprises an upper section. The first section 12 includes a first cross beam 16 comprising a molded structure with integral features. The first cross beam 16 has an upper wall 18 having a first end 20 and an opposing second end 22. Intermediate the first and second ends 20, 22, the upper wall 18 has an outwardly bowed portion 24 where the width of the upper wall 18 is greater than a width at the first and second ends 20, 22. Proximate each of the first and second ends 20, 22, the upper wall 18 includes a first opening 26 formed therein. The first openings 26 provide a connection point for an attachment member (not shown) to be coupled to the first openings 26. In one exemplary embodiment, the first openings 26 provide integral shooter duct attachment locations. First openings 26 thus permit the attachment of a shooter duct assembly (not shown) or the like to the upper cross beam 16. As is known, the shooter duct assembly serves to direct air along a defined passageway to a desired remote location, e.g., a vent on an instrument panel (not shown).

Figure 2:
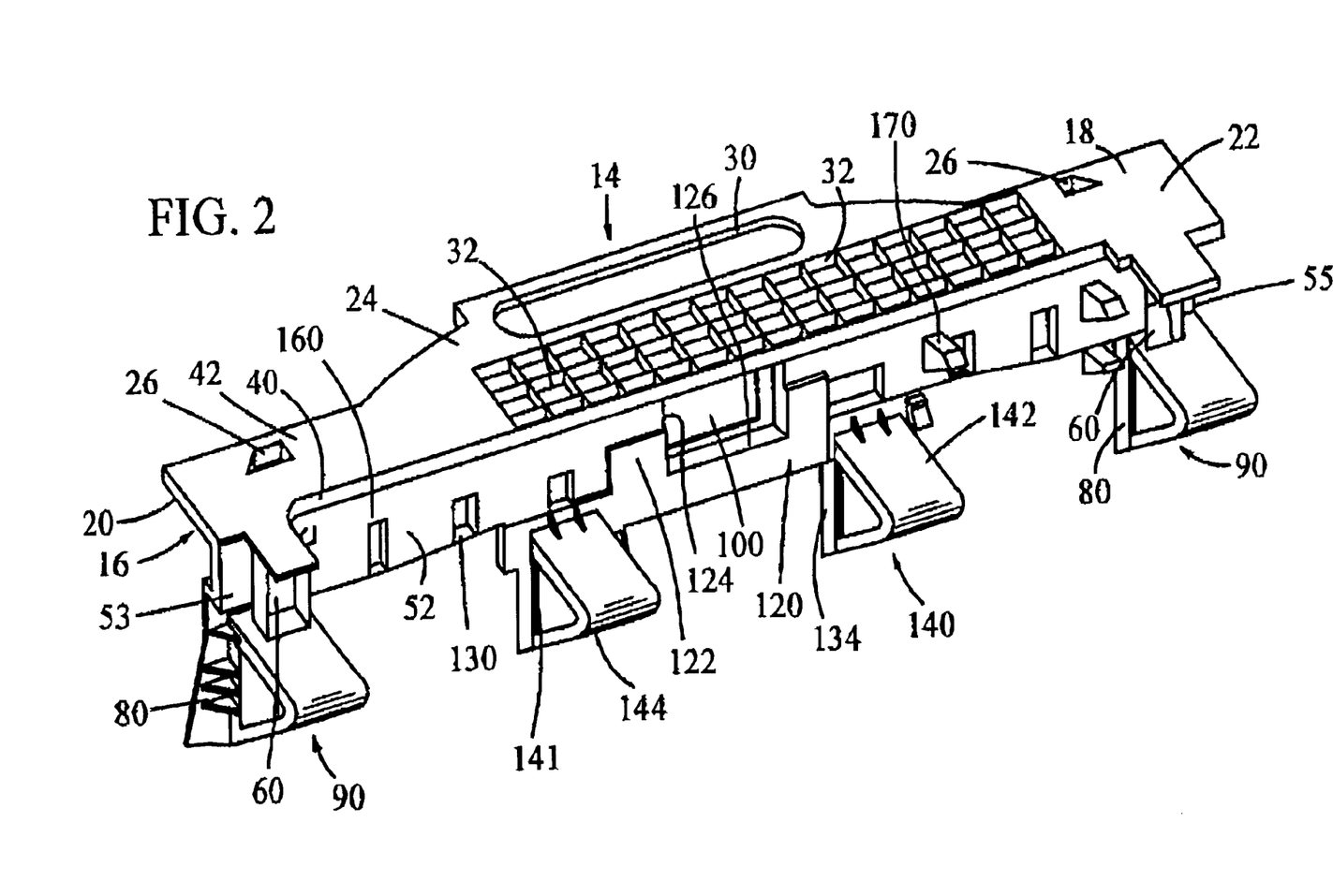
FIG. 2 is a perspective view of a first section of the ISHS of FIG. 1.

Referring now to FIGS. 2–8. As shown in FIG. 2, the upper wall 18 includes an elongated opening 30 formed therein and more specifically the elongated opening 30 is formed in the outwardly bowed portion 24 thereof. The elongated opening 30 is also formed intermediate the first openings 26. In the exemplary embodiment, the elongated opening 30 serves as a defroster opening to direct air therethrough to make contact with a windshield (not shown) for defrosting thereof when the user has activated and selected for an air supply device (not shown) to provide air to the windshield for such defrosting action. The upper wall 18 further includes a plurality of structural ribs 32 formed therein. In the illustrated embodiment, the plurality of structural ribs 32 is formed between the first openings 26 and between the elongated opening 30 and an integral wire channel 40 which is formed on the upper wall 18 and extends longitudinally across the upper wall 18. The integral wire channel 40 comprises a member having a center tract 42 for receiving wiring harnesses and the like. By disposing wires and the like within the center tract 42, the wires are located and protected from other components while at the same time, the wires may be conveniently routed across the ISHS 10. The plurality of structural ribs 32 may take a variety of shapes and in the illustrated embodiment, each structural rib 32 is rectangular in shape. The structural ribs 32 may be orientated in a number of patterns which are formed of a predetermined number of rows and columns in order to provide the desired structural rigidity to the upper cross beam 16. For example in the exemplary embodiment shown, the structural tabs 32 are orientated in a pattern having three (3) rows and a predetermined number of columns.

The first section 12 further includes a rear wall 52 which is integrally connected to the upper wall 18. It being understood that the rear wall 52 generally faces occupants in a vehicle compartment (not shown) when the ISHS 10 is mounted between a vehicle body. The rear wall 52 has a first end 53 and an opposing second end 55, wherein the first end 20 of the upper wall 18 is orientated next to the first end 53 of the rear wall 52. In the exemplary and illustrated embodiment, the upper wall 18 and the rear wall 52 are generally perpendicular to one another. The rear wall 52 extends from the first end 20 to the second end 22 of the upper wall 18. Rear wall 52 has a number of integral extruded features including recessed grooves, openings, and raised portions extending therefrom, as will be described in greater detail hereinafter.

More specifically, the rear wall 52 includes a pair of end openings 60 formed proximate the first and second ends 53, 55. In an exemplary embodiment, the openings 60 are rectangular in shape. End openings 60 preferably serve as end vent outputs in which air is directed therethrough so that the air may be routed to specific locations in the vehicle compartment for specific functions. The rear wall 52 further includes a pair of end arms 80 which are integrally formed with the rear wall 52 at the first and second ends 53, 55. The pair of end arms 80 extend downwardly away from the upper wall 18. In an exemplary embodiment, the pair of end arms 80 form a part of a pair of integral end knee energy absorbing brackets 90. As is known in the art, the end knee energy absorbing brackets 90 are used to hold a knee bolster (not shown) and also absorb energy during predetermined events.

The rear wall 52 also includes a central opening 100 formed therein intermediate to the pair of end openings 60. The central opening 100 is preferably positioned in the rear wall 52 so that central opening 100 is intermediate in relation to ends of the elongated opening 30 formed in the upper wall 18. The rear wall 52 also includes a raised portion 120 which includes a pair of upwardly extending raised arms 122 disposed adjacent to ends 124 of the central opening 100. The central opening 100 is also defined by a lower edge 126 which also comprises an edge of the raised portion 120. The raised portion 120 extends below a lower edge 130 of the rear wall 52 and has an arcuate surface 134 which extends longitudinally. The rear wall 52 also includes a pair of intermediate knee energy absorbing brackets 140 which are integrally formed with the rear wall 52 and more specifically form a part of the raised portion 120. The rear wall 52 also includes a predetermined number of depressions, generally indicated at 160, formed therein at specific locations. The depressions 160 may take a number of shapes and in the illustrated embodiment, the depressions 160 have a generally rectangular shape. Because in an exemplary embodiment, the first and second sections 12, 14, respectively, are coupled to one another by a welding process, e.g., vibration welding, the depressions 160 are used in the welding process to ensure that a secure fit and strong weld results between the first and second sections 12, 14. In the illustrated embodiment, three depressions 160 are formed between the center opening 100 and one of end openings 60. The rear wall 52 also has a predetermined number of extruded features in the form of integral air bag module attachments, generally indicated at 170. Each of the air bag module attachments 170 extends outwardly away from the rear wall 52 and are designed to mount an air bag module (not shown). According to the present invention, the first section 12 and the features thereof are integrally formed during a suitable molding process.

Figure 3:
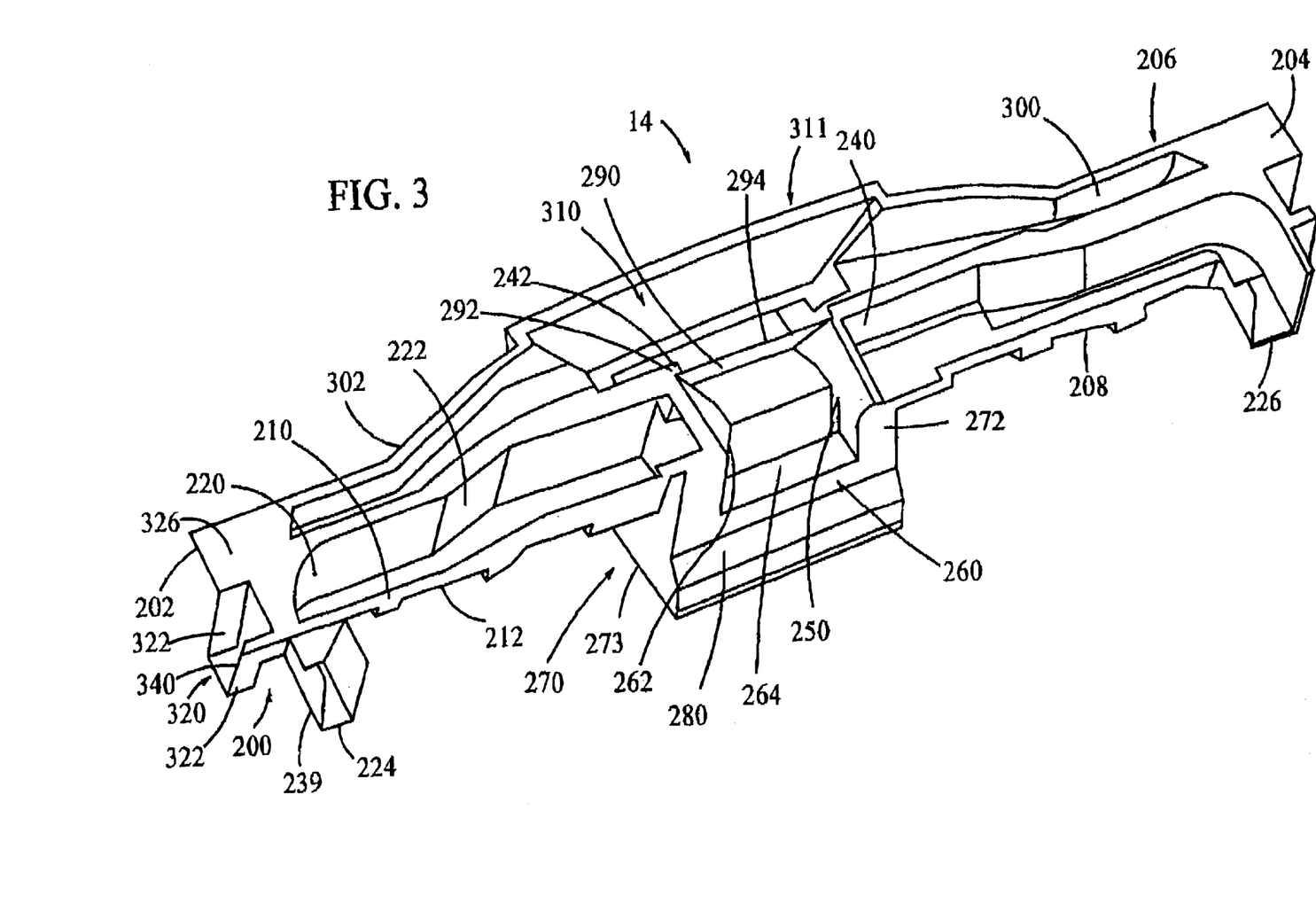
FIG. 3 is a perspective view of a second section of the ISHS of FIG. 1.

Similar to the first section 12, the second section 14 comprises an integral member including a second cross beam 200. The second cross beam 200 has a first end 202 and an opposing second end 204. The second cross beam 200 generally includes an upper surface 206 and a rear surface 208. The rear surface 208 includes an upper edge 210 and a lower edge 212. Integrally formed within the second cross beam 200 is an integral first fluid duct, generally indicated at 220, which extends longitudinally across the second cross beam 200 from the first end 202 to the second end 204. The first fluid duct 220 comprises an integral channel formed within the second cross beam 200. The first fluid duct 220 is partially defined by the rear surface 208 and is also defined by an inner wall 222 which is spaced from the rear surface 208 to form the first air duct 220. The first fluid duct 220 has a first arcuate end portion 224 at one end and a second arcuate end portion 226 at an opposite end. More specifically, the first and second arcuate end portions 224, 226 comprise sections of the first fluid duct 220 which are generally perpendicular to the rear surface 208. Each of the first and second arcuate end portions 224, 226 are defined by a pair of spaced end wall extensions generally indicated at 239. Accordingly, the spaced end wall extensions 239 extend beyond the rear surface 208. As best shown in FIG. 3, the first fluid duct 220 is open at a top portion thereof and is designed to permit air flow within the channel defined thereby and because the first and second arcuate end portions 224, 226 comprise bent portions, the fluid flowing within the channel is directed outwardly relative to the rear surface 208.

Referring specifically to FIGS. 1, 3, 5–7, the first fluid duct 220 has a center portion 240 which includes first and second connecting walls 242, 244 which extend latitudinally across the rear surface 208 to the inner wall 222. The connecting walls 242, 244 thus enclose the first fluid duct 220 on a third side so that the first fluid duct 220 has opposing center entrances in the form of generally rectangular openings, generally indicated at 250.

Intermediate the connecting walls 242, 244, the rear surface 208 has a cut-away portion 260 which is generally centrally formed between the first and second ends 202, 204. The cut-away portion 260 is defined by opposing parallel walls 262 defined in the rear surface 208 and a lower edge 264 which extends between the parallel walls 262 at a lower portion thereof The second cross beam 200 also includes an integral HVAC module upper casework, generally indicated at 270. The HVAC module upper casework 270 has a rear surface 272 which is raised relative to the rear surface 208, wherein the raised rear surface 272 includes a pair of integral raised opposing arms 273 which ,are formed on both sides of the cut-away portion 260. In other words, the opposing parallel walls 262 and the lower edge 264 comprise portions of the raised rear surface 272.

In one embodiment. the HVAC module upper casework 270 includes an arcuate surface 280 which is angled away from the rear surface 272. The arcuate surface 280 preferably has a complementary shape as the arcuate surface 134 so that during assembly of the ISHS 10, the arcuate surface 280 seats against the arcuate surface 134 in a complementary manner. The HVAC module upper casework 270 will be described in greater detail hereinafter.

The second cross beam 200 also includes a center fluid duct 290 integrally formed between the connecting walls 242, 244, wherein the center fluid duct 290 has a generally rectangular shape defined by a pair of side walls 292 and an upper wall 294 which extends between upper portions of the pair of side walls 292. The center fluid duct 290 has a duct opening 297 which is designed to permit fluid, e.g., to flow therethrough and exit the ISHS 10. The center fluid duct 290 is aligned with the cut-away portion 260 of the rear surface 280 so that the pair of side walls 292 are intermediate the opposing parallel side walls 262. Accordingly, the center fluid duct 290 is designed to permit air flow from the integral HVAC module upper casework 270 through the center fluid duct 290 to desired output locations along the instrument panel or the like.

According to the exemplary embodiment, the center fluid duct 290 is formed so that the center fluid duct 290 does not prevent fluid communication within the first fluid duct 220 wherein the air is permitted to flow through the HVAC module upper casework 270 and the slots 250 resulting in fluid communication within the first fluid duct 220 from the first arcuate end portion 224 to the second arcuate end portion 226. The center duct 290 thus generally partitions the first fluid duct 220 into a first section 221 and a second section 223.

Figure 6:
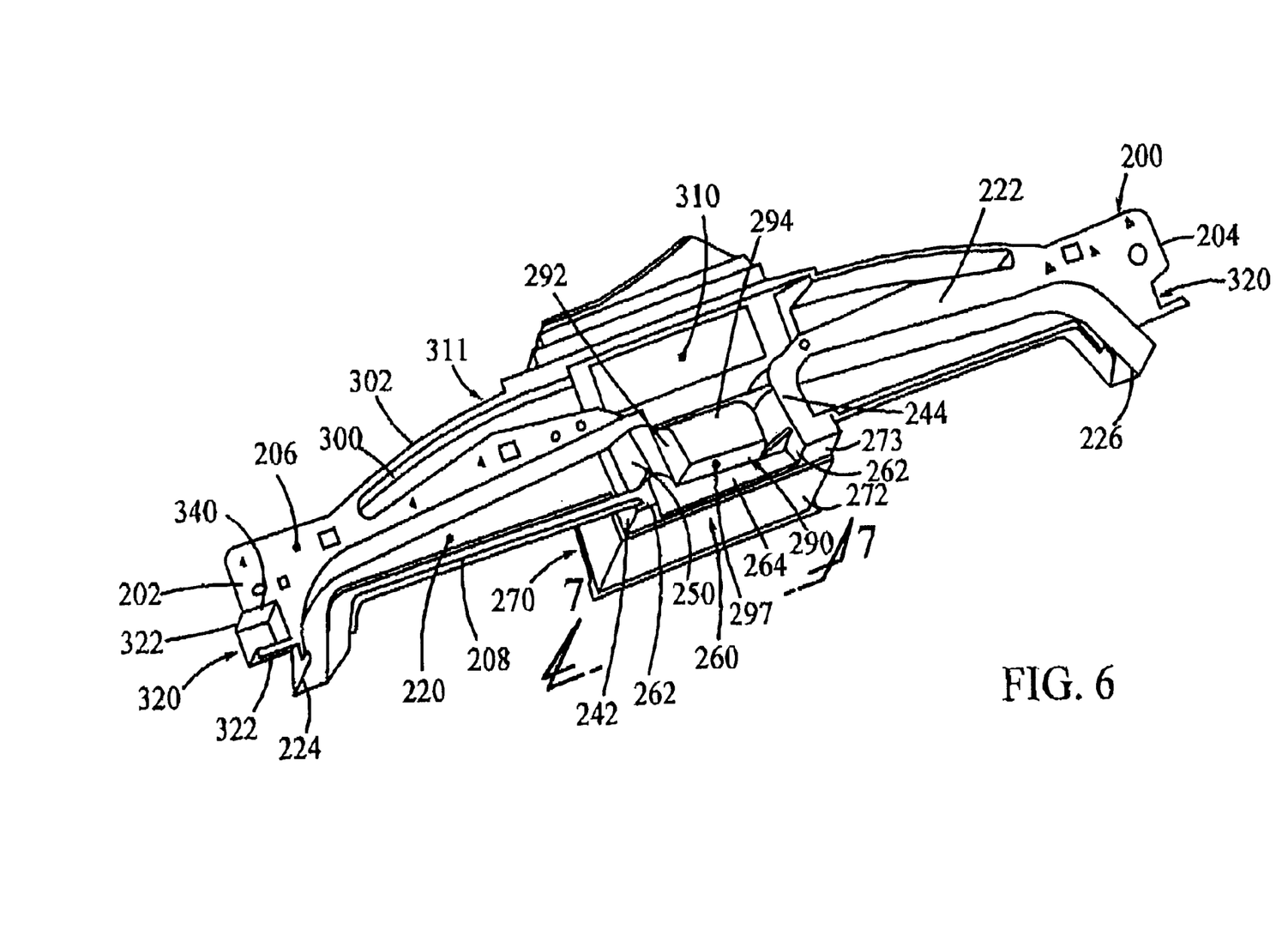
FIG. 6 is a top perspective view of the second section of the ISHS of FIG. 1.
Figure 7:
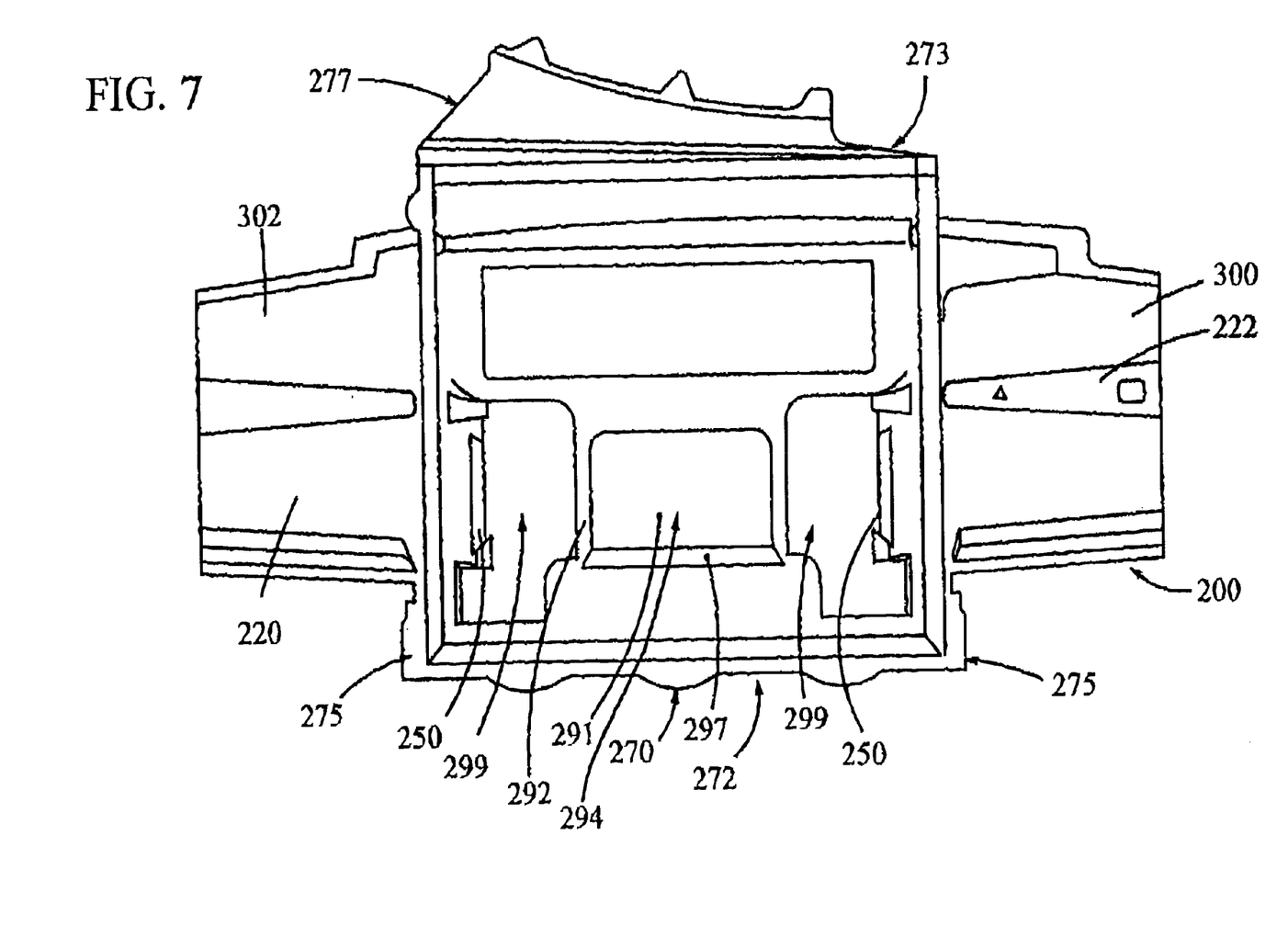
FIG. 7 is a partial cross-sectional bottom plan view of the second section of the ISHS of FIG. 6 taken along the line 7—7.

Referring now specifically to FIGS. 6–7. As best shown in FIG. 7, the HVAC module upper casework 270 is open ended and is defined by the rear surface 272, an opposing front surface 273, and opposing side surfaces 275. The surfaces 272, 273, 275 form a generally rectangular shaped member which has a cavity 291 defined thereby. The front surface 273 includes an inlet portion 277 which permit a fluid, e.g., air, to be directed into the HVAC module upper casework 270 for distribution therein. The inside portions of the surfaces 273, 275, 277 are contoured so that air flows along the surfaces thereof and is directed into the particular air duct for distribution of the air within the vehicle compartment.

As best shown in FIG. 7, a center fluid director 291 is formed in the surface of the upper wall 294 of the center duct 290 for directing air which contacts the center fluid director 291. The center fluid director 291 is formed so that the fluid flows along the surfaces thereof and exits through the duct opening 297. Extending between the side walls 292 and the parallel walls 262 is a pair of first fluid directors 299 each of which is formed to direct the air entering the HVAC module upper casework 270 to the first fluid duct 220 and more specifically, the first fluid directors 299 direct the air to the slots 250 which comprise entrances into the first air duct 220 where the air is channeled to a desired location(s). It being understood that the occupant of the vehicle controls the air flow direction by selecting the appropriate mode using a controller or the like.

The rear portion of the center fluid duct 290 is preferably integral with the inner wall 222 and the center fluid duct 290 is in fluid communication with the HVAC module upper casework 270 so that air that is passed through the HVAC module upper casework 270 contacts the walls of the center fluid duct 290 and the air flow is directed thereby to a desired location.

Referring to FIGS. 2–8, the second cross beam 200 also includes a second fluid duct 300 formed therein. In an exemplary embodiment, the second fluid duct 300 is partially defined by the inner wall 222 and a front wall 302 of the second cross beam 200. The second cross beam 200 also has a bowed-out portion 311 which comprises the widest section of the integral lower cross beam 200. As shown in the Figures, the front surface 302 is generally parallel to the rear surface 208 at ends thereof and intermediate thereto, the front surface 302 angles outwardly to form the bowed-out portion 311 of the second cross beam 200. The second fluid duct 300 preferably has a depth less than a depth of the first fluid duct 220 and in an exemplary embodiment, the second fluid duct 300 comprises an integral side window defogging air duct. The second fluid duct 300 is closed ended at ends 301 thereof and generally is formed of a first section 303 and a second section 305, where the first and second sections 303, 305 are formed on opposing sides of the HVAC module upper casework 270. The second fluid duct 300 is formed in the second cross beam 200 extending towards the first and second ends 202, 204 thereof and terminates in the closed ends 301 prior to intersecting the first and second ends 303, 305.

Figure 4:
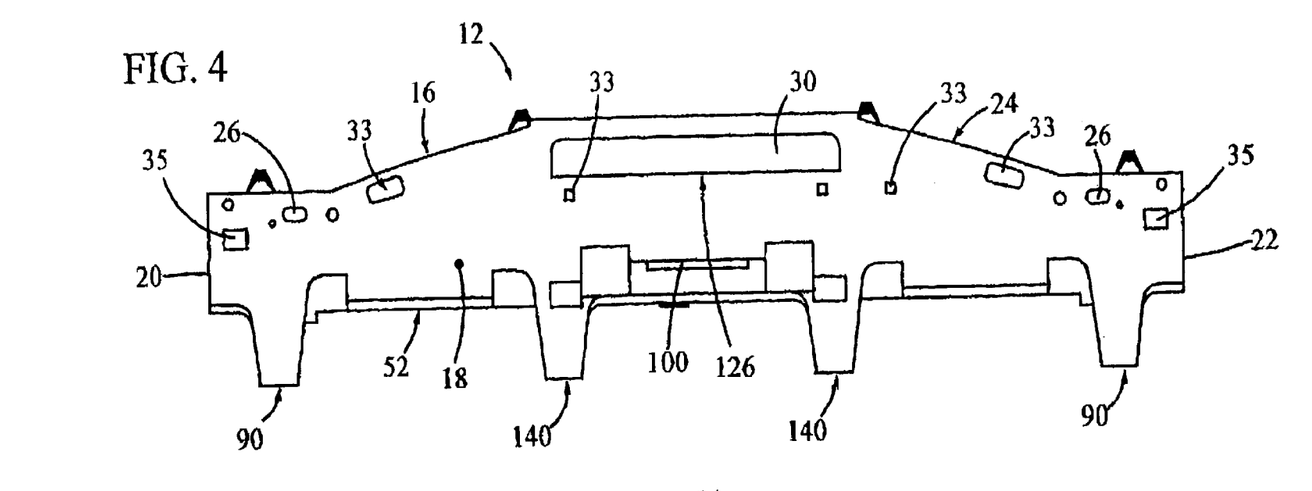
FIG. 4 is a top plan view of an exemplary first section for use with the ISHS of FIG. 1.
Figure 5:
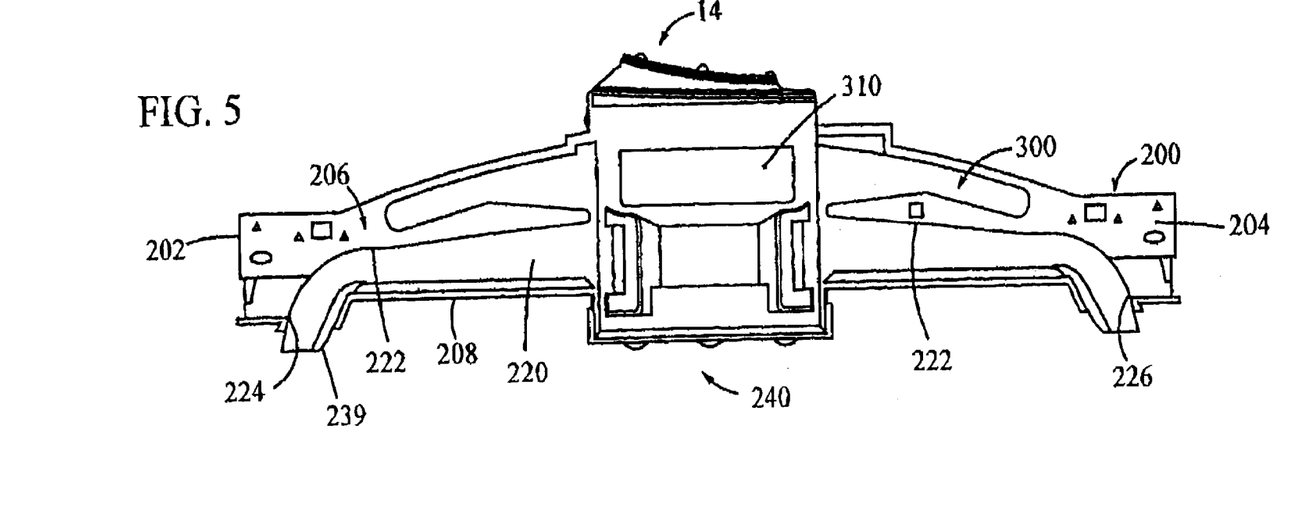
FIG. 5 is a bottom plan view of the second section of the ISHS of FIG. 1.

The second cross beam 200 also includes an integral third fluid duct 310 formed therein and disposed generally within the bowed-out portion 311 of the second cross beam 200. As best shown in FIGS. 5 through 7, the third fluid duct 310 comprises, in an exemplary embodiment, a rectangular opening. The design of the bowed-out portion 311 of the second cross beam 200 increases the area of the third fluid duct 310 and because the bowed-out portion 311 of the second cross beam 200 complements the bowed-out portion 24 of the first cross beam 16, the elongated opening 30 is positioned above the third fluid duct 310 so that fluid communication is provided between the elongated opening 30 and the third fluid duct 310. In the exemplary embodiment, the air flow from the third fluid duct 310 is channeled and used for a defrosting action in which the air flows through the elongated opening 30 and contacts the windshield for defrosting thereof. The third fluid duct 310 is also in fluid communication with the second fluid duct 300 so that air flowing into the HVAC module upper casework 270 through the inlet portion 277 flows through the third fluid duct 310 and is permitted to fluidly flow within the second fluid duct 300. As best shown in FIG. 4, openings 33 formed in the first section 12 are disposed above the second fluid duct 300 when the first and second sections 12, 14 are assembled so that fluid flowing within the second fluid duct 300 flows out through the openings 26 and is directed to a desired location within the vehicle compartment to accomplish a chosen function, e.g., defogging of side windows of the vehicle. In addition, other openings 35 may be formed in the first section 12 to provide mounting locations or to provide additional locations for the addition of other fluid ducts.

The second cross beam 300 also includes side mounting members 320 integrally formed therein. The side mounting members 320 are formed at each of the first and second ends 202, 204, respectively. As shown, the side mounting members 320 have opposing side walls 322 which are parallel to one another and define a slot 340 therebetween. Each of the side mounting members 320 is formed proximate one of the first and second arcuate end portions 224, 226. The slot 340 opens outwardly in a direction away from the first fluid duct 220. The side mounting members 320 are preferably used as mounting members for mounting the assembled ISHS 10 to the vehicle body. FIG. 4 is a top plan view of an exemplary upper section 12 which is essentially the same member as that shown in FIG. 1 with the exception that the plurality of structural ribs 32 is eliminated for purpose of illustration. In addition, openings 33 and 35 are illustrated and as previously mentioned, the first section 12 may have a number of openings formed therein at predetermined desired locations so that air may be directed to other conduits or members to provide certain functions, such as cooling or heating a location of the vehicle. FIG. 5 is a bottom plan view of the second section 14 of the ISHS 10 and FIG. 6 is a top perspective view of the second section 14. FIG. 7 is a partial cross-sectional bottom plan view of the second section 14 and shows the HVAC module upper casework 270 in greater detail.

Referring now to FIGS. 1–8, the assembly of the ISHS 10 will now be described in greater detail hereinafter. To assembly the ISHS 10, the first section 12 is positioned generally above the second section 14. In orientating the first and second sections 12, 14 relative to one another so that the rear wall 52 of the first cross beam 16 and the rear surface 208 of the second cross beam 200 face the same direction and the rear wall 52 is disposed above the rear surface 208 of the second cross beam 200.

The first and second arcuate end portions 224, 226 are aligned with and inserted through the end openings 60 formed in the rear wall 52 of the first cross beam 16. Likewise during the assembly of ISHS 10, the center duct 290 is aligned with the center opening 100 formed in the rear wall 52 of the first cross beam 16 so that air directed through the center fluid duct 290 fluidly passes through the center opening 100 and away from the rear surface 52 of the first cross beam 16. In addition, the third fluid duct 310, comprising the integral defroster, is aligned with the elongated opening 30 so that air may fluidly communicate therebetween to provide the desired defrosting action. Openings 33 are disposed above the second fluid duct 300 so that fluid flows away from the second fluid duct 300 and exits therefrom at these predetermined locations.

According to the present invention, the assembly of the first section 12 and the second section 14 completes and seals the first, second, and third air ducts 220, 300, 310, respectively, except for the selectively formed openings located in the first section 12. More specifically, the upper wall 18 of the first cross beam 16 serves to enclose the upper open portions of the first, second, and third air ducts 220, 300, 310 because the upper wall 18 extends across the upper edges of the rear surface 208, inner wall 222, and front surface 302. Accordingly when the first section 12 and the second section 14 are coupled together to form ISHS 10, the raised rear surface 272 of the second cross beam 200 seats against the complementary and similarly shaped raised portion 120 of the first cross beam 16 while the HVAC module upper casework 270 is not restricted so that air may flow therethrough via inlet portion 277 and into at least one of the first, second, and third air ducts 220, 300, and 310. As is known in the art, a controller including a valve device or the like (not shown) may be used for selectively directing the fluid flow within the ISHS 10. More specifically and depending upon the mode which the occupant of the vehicle has selected, the fluid entering the HVAC module upper casework 270 by way of the inlet portion 277 may be routed in one of the given fluid ducts 220, 300, 310 integrally formed in the ISHS 10 by either permitting or restricting the fluid from flowing within these fluid ducts.

Figure 8:
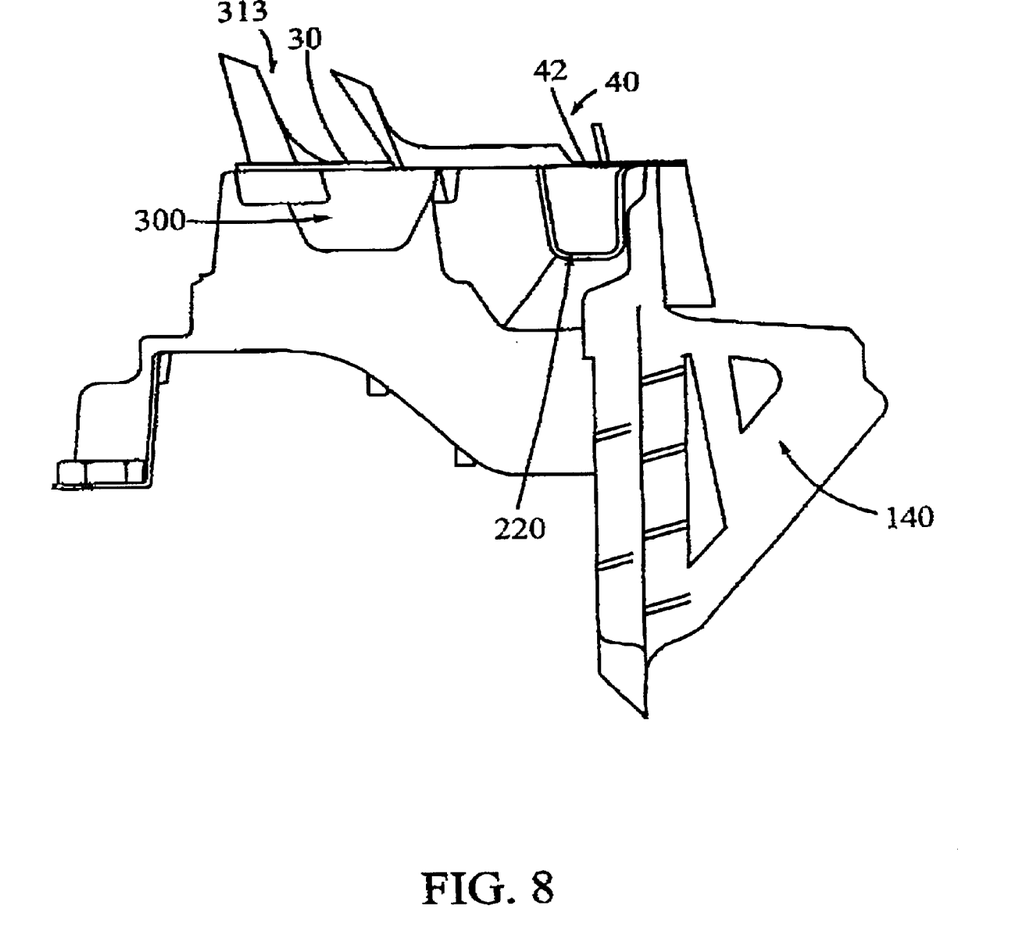
FIG. 8 is a cross-sectional side elevational view of the ISHS of FIG. 1.

FIG. 8 is a cross-sectional side elevational view of the ISHS 10 in an assembled condition. In one exemplary embodiment, the first section 12 includes raised integral features 313 which extend upwardly from the upper wall 18. The raised integral features 313 are formed about the second fluid duct 300. In one exemplary embodiment, the raised integral features 313 serve as integral instrument panel attachment features. As shown in FIG. 8, the first section 12 and the second section 14 are complementary to one another and mate with one another in an interlocking manner so that the openings and the fluid ducts align with each other.

The ISHS 10 is formed of any suitable material which is capable of being molded and in an exemplary embodiment, the ISHS 10 is formed of a plastic material. Any suitable process may be used to securely couple the first section 12 to the second section 14 to form the ISHS 10. In one exemplary embodiment, a welding process is used. For example, a vibration welding process may be used to securely attach the first and second sections 12, 14, respectively, to form the ISHS 10.

According to the present invention, the ISHS overcomes the deficiencies and limitations of the prior art by providing an integrated structure having a high degree of functional and physical integration which offers the following benefits. The ISHS is formed of a plurality of molded members. For the purpose of illustration only, the ISHS has been described with reference to two molded members, namely the first and second sections; however, one will appreciate that three or more molded members may be used to form the ISHS according to the teachings of the present invention. First, the present invention provides product packaging improvements due to the HVAC module integration into the cross-car beam. This integration enables the HVAC module, primarily the valving, to be packaged in a higher vehicle position enabling a more spacious interior compartment. This can lead to a volume savings potential on the order of about 2–6 liters. Second, due to the high degree of integration, the cost of the ISHS compared to conventional multi-component devices shows a competitive benefit. Third, the mass of the ISHS shows an improvement versus prior art because of the high level of part integration. Fourth, tooling cost is improved compared to conventional prior art due to the maximized feature integration of the ISHS. The ISHS of the present invention also provides the ability to tune structural performance by strategic material selection and part design. The high level of integration demonstrated in the ISHS provides for a more robust system design because the integral nature of the ISHS eliminates the need to attach parts to the main structure. Fewer attached parts translates to less opportunity for squeak and rattle and other quality deficiencies.

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An integrated structural HVAC assembly comprising:
a first cross beam having a first end, and an opposing second end, the first cross beam having an upper surface and a rear surface integrally formed therewith, the upper surface having a first opening formed therein, the rear surface having a pair of second openings formed therein proximate the first and second ends with a third opening being formed intermediate to the pair of second openings, and
a second cross beam having a first end and an opposing second end and a central portion intermediate to the first and second ends, the second cross beam having a module section for receiving fluid, the second cross beam including a first fluid duct integrally formed therein, the first fluid duct having a first open end proximate the first end of the second cross beam and a second open end proximate the second end of the second cross beam, the second cross beam further including a center fluid duct and a second fluid duct integrally formed therein, the first, second, and center fluid ducts being in fluid communication with the module section, the first and second cross beams mating with one another so that the upper surface extends across the second cross beam to enclose the first, second, and center fluid ducts, the first fluid duct being in fluid communication with the pair of second openings, the center fluid duct being in fluid communication with the third opening, the second fluid duct being in fluid communication with the first opening.

2. The integrated structure HVAC assembly as set forth in claims 1, further including:
a third fluid duct integrally formed in the second cross beam, the third fluid duct being in fluid communication with the first opening.

3. The integrated structural HVAC assembly as set forth in claim 1, wherein the first opening comprises a defroster air opening in which air entering the module section fluidly passes through the second duct prior to exiting through the first opening.

4. The integrated structural HVAC assembly as set forth in claim 1, wherein the second cross beam includes an upper surface in which the first, second, and central ducts are formed therein and a rear surface integrally formed therewith.

5. The integrated structural HVAC assembly as set forth in claim 4, wherein the first duct includes first and second ends which extend outwardly beyond the rear surface of the second cross beam, the first and second ends extending through the pair of second openings.

6. The integrated structural HVAC assembly as set forth in claim 1, wherein the first duct comprises an integral air conditioning duct.

7. The integrated structural HVAC assembly as set forth in claim 1, wherein the center duct is formed so that the first duct is partitioned into a first section extending from the center duct to the first end of the second cross beam and a second section extending from the center duct to the second end of the second cross beam.

8. The integrated structural HVAC assembly as set forth in claim 1, wherein the module section includes an inside surface having a plurality of integral fluid diverters formed therein for directing the air flowing into the module section to one of the first, second, and center fluid ducts.

9. The integrated structural HVAC assembly as set forth in claim 1, wherein the first duct is defined by the rear surface and an inner wall, the inner wall partitioning the first duct from the second duct which is also defined by a front surface which opposes the rear surface.

10. The integrated structural HVAC assembly as set forth in claim 2, wherein the third duct partitions the second duct in a first section and a second section, the first section extending from the second duct towards a duct end, the second section extending from the second duct towards an opposite duct end.

11. The integrated structural HVAC assembly as set forth in claim 9, wherein the upper surface of the first cross beam includes a vent disposed above the first section of the second duct and another vent disposed above the second section of the second duct.

12. The integrated structural HVAC assembly as set forth in claim 1, wherein the upper surface of the first cross beam includes an integral wire channel formed therein, the integral wire channel longitudinally extending along the upper surface between the first and second ends.

13. The integrated structural HVAC assembly as set forth in claim 1, wherein the first and second ends of the second cross beam each includes a mounting member integrally formed therein, each mounting member including a slot defined by a pair of side walls.

14. The integrated structural HVAC assembly as set forth in claim 1, wherein the upper surface of the first cross beam includes a plurality of structural ribs formed thereon.

15. The integrated structural HVAC assembly as set forth in claim 1, wherein the rear surface of the first cross beam includes integral attachment members extending outwardly therefrom.

16. The integrated structural HVAC assembly as set forth in claim 1, wherein the first and second cross beams are securely attached to one another by a fusing process.

17. The integrated structural HVAC assembly as set forth in claim 1, wherein the module section of the second cross beam comprises an HVAC module casework.

18. The integrated structural HVAC assembly as set forth in claim 15, wherein the integral attachment members comprise air bag module mounting attachments.

19. The integrated structural HVAC assembly as set forth in claim 1, wherein said first cross beam and said second cross beam are formed from an injection molding process.

20. The integrated structural HVAC assembly as set forth in claim 1, wherein said first cross beam and said second cross beam are plastic.

21. The integrated structural HVAC assembly as set forth in claim 1, wherein a bottom wall portion of said first fluid duct is further away from said first cross beam than a bottom wall portion of said second fluid duct.

22. An integrated structural HVAC assembly comprising:
a first cross beam having a first end, and an opposing second end, tile first cross beam having an upper surface and a rear surface integrally formed therewith, the upper surface having a first opening formed therein, the rear surface having a plurality of second openings, and
a second cross beam having a first end and an opposing second end, the second cross bean having a module section for receiving fluid and a first fluid duct, a second fluid duct and a center fluid duct each being in fluid communication with the module section, the first and second cross beams mating with one another so that the upper surface extends across the second cross beam to enclose the first fluid duct, the second fluid duct and the center fluid duct wherein the first fluid duct is aligned with at least one of the plurality of second openings and the second fluid duct being aligned with the first opening.

23. The integrated structural HVAC assembly as set forth in claim 22, wherein the first fluid duct, the second fluid duct and the center fluid duct are integrally formed in the second cross beam.

24. The integrated structural HVAC assembly as set forth in claim 23, wherein a bottom wall portion of said first fluid duct is further away from said first cross beam than a bottom wall portion of said second fluid duct.

25. A structural cross beam for a vehicle, comprising:
a first member;
a second member, said second member including a first fluid duct, a second fluid duct and a third fluid duct each being configured to be in fluid communication with a central fluid duct, said first member being configured to be fixedly attached to said second member wherein said first member provides a wall portion of said first fluid duct, said second fluid duct and said third fluid duct as said first member is fixedly attached to said second member wherein said first fluid duct is in fluid communication with a pair of openings in said first member and said second fluid duct is in fluid communication with another opening in said first member and said center fluid duct is in fluid communication with a center opening of said first member.

26. The structural cross beam as in claim 25, wherein said first member and said second member are formed from an injection molding process.

27. The structural cross beam as in claim 25, wherein said first member and said second member are plastic.

28. The structural cross beam as in claim 25, wherein said first member includes a plurality of structural features.

29. The structural cross beam as in claim 25, wherein said first member includes an integral wire channel extending along a portion of a surface of said first member.

30. The structural cross beam as in claim 25, wherein said first member includes an upper portion and a wall portion, said wall portion being configured to face an occupant of the vehicle.

31. The structural cross beam as in claim 25, wherein said first member includes an upper portion and a wall position, said wall portion depending away from said upper portion in a plane not parallel to said upper portion.

* * * * *